W. BROAD.
ELECTRIC FLASH LIGHT.
APPLICATION FILED JUNE 25, 1913.
1,097,910.
Patented May 26, 1914.
FIG. 1
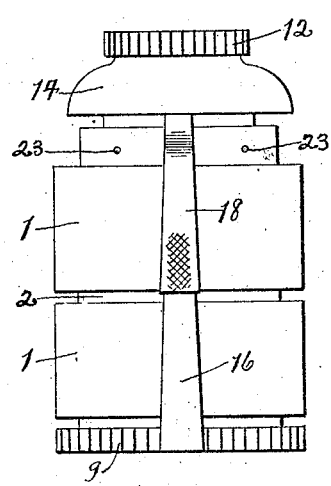
FIG. 2
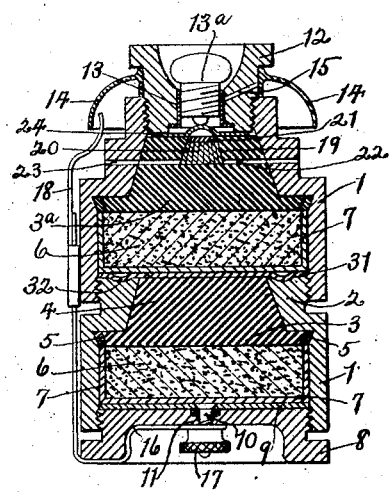
FIG. 4
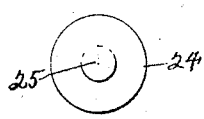
FIG. 3
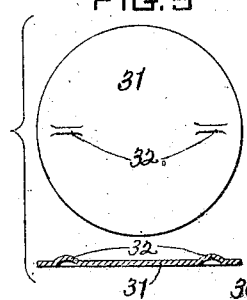
FIG. 5
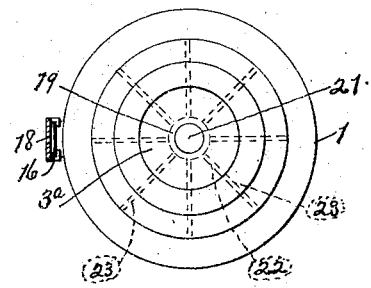
FIG. 6
FIG. 7
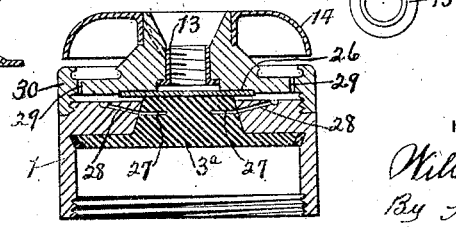
WITNESSES
Ro. D. Harrison.
F. N. Mason.
INVENTOR
William Broad,
By H. W. Stevenson,
Attorney.

UNITED STATES PATENT OFFICE.

WILLIAM BROAD, OF BEAVER FALLS, PENNSYLVANIA.

ELECTRIC FLASH-LIGHT.

1,097,910.  Specification of Letters Patent.  Patented May 26, 1914.

Application filed June 25, 1913.  Serial No. 775,616.

*To all whom it may concern:*

Be it known that I, WILLIAM BROAD, a citizen of the United States, residing at Beaver Falls, in the county of Beaver and State of Pennsylvania, have invented a certain new and useful Improvement in Electric Flash-Lights, of which the following is a specification.

My invention has for its object the production of an improved form of refillable semi-dry cell battery, designed primarily for flash-light purposes, but applicable also as an ignition battery, or for other various uses to which cells of this nature are at present utilized, the type of cell employed making it possible to quickly and cheaply renew the burnt-out or exhausted battery elements.

Another object pertains to mechanical means for disturbing or rotating the zinc anode in order to prevent corrosion from forming on the face of this member which is exposed to attack of the excitant electrolyte.

A further advance in the art lies in the novel means employed for taking care of or dissipating gases generated within the cells, whereby the moisture or condensation that may arise from or by reason of mechanically applied compression or osmotic action is properly vented, and kept away from contact with the lamp and metal terminals.

A still further object and advantage is in the peculiar formation of the carbon cathode, which preferably constitutes a fixed and permanent part of the cells, whereby a positive and efficient sealing means is obtained in order to minimize leakage or escape of the moisture.

Other important and essential advantages will present themselves during the progress of the following specification, wherein the accompanying drawing discloses several modified applications of my invention, which I desire it understood are merely illustrative, and I therefore do not limit myself to the exact formations shown, but reserve the right to make any necessary alterations and amendments thereto that will conform to the original intention of the invention, and which will be within the scope of the appended claims.

Referring then to said drawings, Figure 1 shows an assembled view of my improved flash-light battery comprising two cell units. Fig. 2 is an assembled view in vertical section showing all parts in their relative coacting and contacting positions: Fig. 3 is a plan view of Fig. 2 with the lamp retaining plug removed: Fig. 4 shows a plan of a removable contact member: Fig. 5 shows both plan and cross sectional views of one of the zinc anodes: Fig. 6 is a plan view of a metallic threaded sleeve or receptacle that receives and houses the lamp, and Fig. 7 shows a vertical section of a modified form of removable cap member as applied to a cell housing a modified construction of a carbon cathode.

Throughout the drawings the numeral 1 designates the receptacle or cell for housing the removable battery elements, the same being constructed out of any suitable insulating material, each cell being interiorly threaded at one end, and at the opposite end provided with a reduced diameter 2, which is exteriorly threaded in order that the coacting cells may be screwed together, and provide means for an exteriorly adjustable compression feature to act directly on the confined battery elements.

The carbon cathode 3, which preferably forms a fixed portion of each cell, is adequately seated at one end thereof, and is provided with a tapered extension or cork 4, which projects through a correspondingly tapered aperture arranged in the cell, the exposed face of said cork portion protruding slightly beyond the outer surface of the extension 2. In order to adequately anchor said member 3 in fixed position, and prevent leakage around the same, a suitable sealing material 5 of a moisture resisting nature, is packed between the wall of the cell and tapered flange provided in said carbon, which insures a wedged or keyed union at this point and greatly minimizes the possibility of said member 3 becoming loosened, or from moving away from its anchored seat.

Each cell will house a removable and renewable depolarizing block or cake 6, which carries a closely adhering and protecting cover of a suitable absorbent filtering material 7 saturated with an excitant electrolyte of a pasty or gelatinous nature, also a zinc anode in the form of a disk, all of which battery elements are held in close contact with one another by an adjustable compression means.

The receptacles or cells will all preferably be of identical configuration and capacity, being made from the same die or mold, the bottom cell, or the one farthest removed from the lamp, being provided with a screw actuated cap or adjustable pressure member 8, which, when in position, bears directly on the zinc disk 9. This said member 9 carries a centrally positioned threaded stem 10 that extends out through an aperture 11 provided in said cap 8, and serves as one pole of the battery. The top cell carries the lamp retaining plug or head 12, which is made of an insulating material, screw threaded at one end, and provided with a central recess to receive a metal screw receptacle 13, in which the lamp 13$^a$ is removably seated. This said plug 12 carries a metallic band or bell shaped member 14 electrically connected with the said receptacle 13 by a wire 15. The circuit through the coacting cells and lamp is completed by means of an exteriorly positioned metal strip 16, which is removably seated over the zinc terminal 10, being kept in good electrical contact therewith by means of a jam nut 17, and extends upward in close engagement with the periphery of the combined cells, its upper free end being provided with a slidable switch member 18, which, when the circuit is closed to glow the lamp, is pushed upward to contact with the metal bell 14, and when the circuit is to be broken it is moved in a reverse direction.

The compression set up in the battery elements when the several cells are screwed together, and likewise when the cap 8 is turned into bearing position against the zinc anode, tends to force the moisture contained in the coacting cells in the direction of the lamp. In order to prevent or greatly minimize the possibility of any of the combined cells' moisture from reaching the lamp base, or other terminal that might be provided at this point, I have provided a venting feature designed to take care of this contingency.

In Fig. 2 I have shown the carbon cathode 3$^a$ of the upper or lamp retaining cell as being provided with a well or recess 19, which is filled with an absorbent material 20, such as blotting paper, asbestos, or the like, and sealed over with a moisture proof element 21, which is designed to catch and retain the greater proportion of moisture that may be forced through the pores of said carbon member 3$^a$ by the applied compression set up, or by reason of osmotic action. Radiating from the central well 19 are a predetermined plurality of ducts 22, which register with similar sized ducts 23 formed through the reduced diameter of the cell, their outer ends being exposed to the atmosphere; the intention being that any moisture collected in said well 19 will finally be dissipated or evaporate. In said Fig. 2 the construction shown therein involves a loosely positioned and renewable contact member 24, in the form of a disk, shown in Fig. 4, provided with a raised portion 25, which said member seats on the exposed face of the carbon cathode 3$^a$ and serves as a suitable contact for the end of the lamp base, while in Fig. 7 is a modification of the foregoing involving a loosely positioned and renewable carbon or graphite disk 26, which delivers current from the cathode to the lamp. The utility of these loosely positioned and removable contact disks are, that it renders it possible to renew these said members from time to time, they being more or less penetrated and subject to breakage by reason of the pressure of the lamp against same, and in addition they serve to deflect any moisture, that may penetrate through the carbon cathode, away from the lamp base. Fig. 7 also shows a modification with respect to the form of lamp retaining cap employed in my invention, likewise a modification pertaining to the dissipation of moisture. In this altered form I have eliminated the moisture collecting well 19 and as a substitute provide the cathode 3$^a$ with a circumferential slot or groove 27 of suitable depth, that registers with ducts 28 formed in the cell, which said coacting ducts are exposed to the atmosphere through ducts 29 provided in the cap 30. This modified cap, shown in Fig. 7, is designed to fit any cell, all of which will be of standard form, thus simplifying the construction and cheapening the cost of manufacture over the form shown in Fig. 2, as it eliminates one extra piece.

It will be seen that only one zinc anode carries a terminal stem, the remaining ones, a detail of which is seen in Fig. 5, being a plain disk 31 having one or more wards 32 that are designed to register in suitable recesses provided in the contacting face of the adjacent cell. By means of these various described constructions it is possible to disturb or rotate the zinc anode of any cell when ever desired in order to keep their active surface clean and prevent the electrolyte containing absorbent material 7 from adhering thereto, the surface of this latter member being preferably covered with a pasty or gelatinous substance. The frequent disturbing or moving of these said zinc members will tend to break the skin of corroded zinc and dissipate any crystallization or collection of waste elements on the active surface of said members which, if left undisturbed, would soon form an insulation that will lower the efficiency and incidentally shorten the life of the battery. This particular construction has a great advantage over the present forms of so called "dry batteries," they having no means for disturbing and preventing the corroded matter from adhering to and insulating the active surface of the zinc anode. My construction permits fresh electrolyte, which is preferably in a pasty or gelatinous form, attacking the cleaned face of the zinc each time the rotating process is applied.

Although the zinc anode employed in my battery is of small area, as compared with the various present well known forms of dry cells, by means of the mechanical rotating feature, brought about by the adjustable screw actuated construction and disturbance from time to time, the entire exposed surface will be attacked simultaneously by the excitant electrolyte, thus obtaining the maximum efficiency of said anode throughout the cells' active life.

The internal resistance of each cell is either increased or diminished proportionately with the amount of screw compression applied to the confined battery elements. A turning out movement of the cap member 8 will tend to break contact between the zinc anode 9 and electrolyte containing or carrying absorbent material 7, while a similar break in the screw union of the respective coacting cells will perform a similar function in the remaining cell or cells should there be more than two involved in the combined battery, when either of the foregoing described actions takes place a resultant decrease in the output of current is brought about, due to the degree of internal resistance set up, which means a lessened voltage and consequent dimming of the lamp filament. The full maximum delivery of the combined cells' current is brought about when all the screw actuated members are turned to their limit of movement and contact with the confined battery elements, which means a minimum of internal resistance and consequent full current output. Any lessening of this screw compression at any point will increase the resistance, diminish the current, and glow the lamp accordingly.

Due to the direct contact of the carbon and zinc electrodes of adjacent cells being internal and sealed from atmospheric influence, it greatly minimizes oxidization at the junction of these two battery elements, and tends to prolong the life of my battery, beyond a construction wherein this contact is external and subject to atmospheric influence.

What I claim as my invention is:

1. An electric torch consisting of a cylindrical battery member and a lamp-holder secured to one end of such cylindrical battery member, said lamp-holder being provided with an annular pole piece concentric with said cylindrical battery member, and a switch or member one end of which is secured to one pole of the battery member at the end opposite the lamp, and the opposite end movable to and from contact with the annular pole piece of the lamp carrying member, substantially as described.

2. An electric flash light comprising an insulatable casing; a removable lamp head carrying a metallic bell-shaped contact member, a battery element removably seated in the casing, said battery involving carbon and zinc electrodes; adjustable means for regulating the degree of compression set up in the battery element to vary the light; and a metallic conductor, one end of which contacts with the zinc anode, and the opposite end having a slidable portion for make and break engagement with the metal contact member carried by the lamp head.

3. An electric flash light comprising a threaded insulatable casing; a battery element removably seated in the casing, said battery element involving carbon and zinc electrodes, the carbon electrode being porous and provided with a gas vent in communication with the atmosphere through the wall of the casing; a threaded insulatable lamp head removably secured to the casing; a metal lamp socket carried by the head; a metallic bell-shaped member also carried by the lamp head the same being electrically connected with the lamp socket; a metallic conductor, one end of which contacts with the zinc electrode, the opposite end having a slidable portion for make and break engagement with the bell-shaped member; and a threadably adjusted member coacting with the threaded casing for regulating the degree of compression in the battery element to vary the light.

4. An electric flash light comprising an insulatable casing; a battery element removably seated in the casing, said battery involving carbon and zinc electrodes; an insulatable lamp head removably secured to the casing involving a metallic lamp socket, said head carrying a bell-shaped metallic contact member electrically connected with the lamp socket; an adjustable pressure member coacting with the casing for regulating the degree of compression in the battery element to vary the light; an exteriorly positioned metal conductor, one end of which contacts with the zinc electrode, the opposite end having an adjustable portion for make and break engagement with the bell-shaped contact member; and means for shifting the position of said conductor simultaneously with the movement of said adjustable member.

5. An electric flash light comprising a casing involving a plurality of insulatable cells, each being screw threaded and coacting with one another; an insulatable lamp receiving head carried by one of the cells involving a metallic annular pole piece electrically connected with the lamp; a battery element involving carbon and zinc electrodes removably seated in each cell and held under an adjustable compression to vary the light; and an exteriorly positioned metal conductor, one end being in removable contact with the zinc electrode of one cell, and the opposite end provided with a slidable switch for make and break contact with the metal pole piece carried by the lamp head.

6. An electric flash light comprising a casing involving a plurality of insulatable cells each being screw threaded and coacting with one another; a battery element removably seated in each cell, said battery elements involving carbon and zinc electrodes, the carbon electrodes being porous and provided with gas vents which communicate with the atmosphere through the wall of the cell; a threaded insulatable lamp head removably secured to one of the cells; a metal lamp socket carried by the said head; a metal bell-shaped member also carried by the lamp head, the same being electrically connected with the lamp socket; a threaded pressure member coacting with one of the cells for regulating the degree of compression in the battery element confined in said cell thereby varying the light; and a metallic conductor, one end being in contact with the zinc electrode of one cell, and the opposite end having a slidable switch for make and break engagement with the bell-shaped member.

In testimony whereof, I affix my signature in the presence of two witnesses.

WILLIAM BROAD.

Witnesses:
M. S. THOMPSON,
H. W. STEVENSON.